Jan. 3, 1961  R. T. WHITCOMB  2,967,030
BOUNDARY-LAYER CONTROL MEANS FOR LIFTING WINGS
Filed Nov. 13, 1957  2 Sheets-Sheet 1

INVENTOR
RICHARD T. WHITCOMB

BY
ATTORNEYS

United States Patent Office 2,967,030
Patented Jan. 3, 1961

2,967,030

BOUNDARY-LAYER CONTROL MEANS FOR LIFTING WINGS

Richard T. Whitcomb, 63C Elizabeth Road, Hampton, Va.

Filed Nov. 13, 1957, Ser. No. 696,297

13 Claims. (Cl. 244—41)

(Granted under Title 35, U.S. Code (1952), sec. 266)

The invention described herein may be manufactured and used by or for the Government of the United States of America for governmental purposes without the payment of any royalties thereon or therefor.

The present invention relates to an aerodynamic configuration to reduce boundary-layer separation on the upper surface of a wing, or airfoil, near the speed of sound, and more particularly to an aircraft having bodies on the wing upper surface to delay boundary-layer separation.

When the speed of an airplane with a lifting wing approaches the speed of sound, boundary-layer separation usually develops on the upper surface of the wing. This separation, caused by a shock wave above the wing, results in substantial increases in drag, buffeting, stability problems, and other adverse aerodynamic effects. It is an object of the present invention to reduce the magnitude of this boundary-layer separation and its adverse effects through the addition of a group of special bodies on the wing.

The added bodies are primarily on top of the wing with the noses near or just ahead of the maximum thicknesses of the local wing sections, the maximum cross sections near the trailing edge of the wing, and the aft portions extending downstream of the trailing edge. The forward portions of these bodies decelerate the supersonic flow ahead of the shock wave with a resulting decrease of the strength of the shock and the associated boundary-layer separation. Also, the curvatures of the middle portions of the bodies reduce the adverse positive pressure gradient downstream of the shock wave which further reduces boundary-layer separation. The addition of such bodies to the wing, of course, results in adverse increases in the skin-friction drag and weight of the airplane. However, with the arrangement of the bodies to be described, at high subsonic speeds the favorable effect of the bodies on boundary-layer separation will considerably outweigh these adverse effects.

The objective of this invention is also accomplished by shaping the fuselage as described in my copending application, Serial No. 606,176, filed 24 August 1956, now U.S. Patent No. 2,874,922, issued 24 February, 1959. However, the present invention provides greater effectiveness since the major part of its favorable action is concentrated closer to the locality of most severe separation. The objective of the present invention is also accomplished with bodies added to the wing panels, which extend ahead of the leading edge and behind the trailing edge of the wing and are indented in the region of the wing. However, adding such bodies results in significant added skin friction and weight and flow interference near the wing leading edge. The adverse effects of these bodies are usually considerably more important than the favorable effect of the bodies on boundary-layer separation associated with the shock wave. These adverse effects are greatly lessened with the bodies described herein.

The invention is described by means of the following figures.

Figure 1:
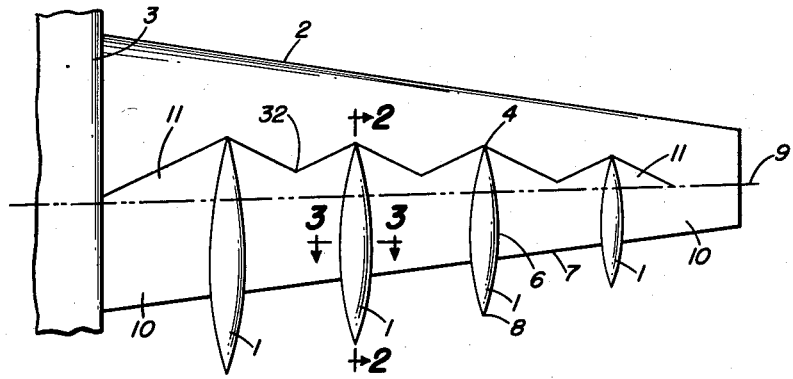
Fig. 1 is a partial plan view of an airplane with a representative embodiment of the present invention.
Figure 2:
Fig. 2 is a cross-sectional view taken on line 2—2 of Figure 1.
Figure 3:
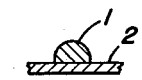
Fig. 3 is a cross-sectional view taken on the line 3—3 of Figure 1.

For the representative embodiment of the invention shown in Figures 1 and 2, relatively small bodies 1 are placed on the upper surface of the wing panel 2 which extends from the fuselage shown partially at 3. The noses 4 of the bodies 1 are near or just ahead of the maximum thicknesses 5 of the local wing sections; the maximum cross sections 6 are near the trailing edge 7 of the wing; and the aft portions 8 extend downstream of the trailing edge. The noses are usually at least one quarter of the local chord length rearward of the leading edge. For the greatest effectiveness, the longitudinal development of cross-sectional area, or rearwardly progressive variation in cross-sectional area, for roughly the forward 20 percent of the body lengths are approximately the same as for a cone. The ratio of length to width for the bodies is moderate and the longitudinal contours are smooth. The cross sections of the bodies may be circular as shown in Figure 3 or may have other shapes. One such alternate shape is described later. The bodies are most effective if located roughly one-half to one wing chord length apart as shown in Figure 1.

Flow surveys have indicated that for a usual wing, such as shown in Figure 1, with a normal amount of lift, the initial shock wave usually forms above the upper surface in the vicinity of shock line 9. This shock wave causes boundary-layer separation in the region 10 which lies between line 9 and the wing trailing edge. The shock wave is associated with the presence of a supersonic flow ahead of the shock, the strength of the shock depending on the magnitude of the supersonic velocities. The forward portion of the bodies 1 decelerates the supersonic flow gradually in the approximate region 11, resulting in a decrease in the strength of the shock 9 with a resulting decrease in the severity of separation in region 10. In addition, the severity of boundary-layer separation caused by the shock wave is greatly increased by a gradient of increasing pressure downstream from the shock 9. The curvatures of the midregion of the bodies 1 produce steamwise gradients of decreasing pressure downstream of the shock which partially counteract the adverse increasing gradient associated with the wing in this region. Thus, they result in further reduction of separation in the region 10. The adverse gradients of increasing pressure associated with the aft portions of the added bodies are primarily downstream of the trailing edge of the wing, and thus, have little effect on the separation on the wing.

Figure 4:
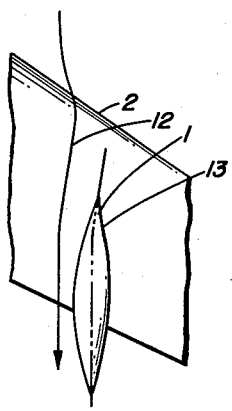
Fig. 4 is a partial plan view of a swept back wing with an improved embodiment of the present invention.

For a lifting sweptback wing the general air flow above the wing moves roughly as shown at 12 of Figure 4, with a slight inward inclination along the forward region and a turn outward above the aft region. Impingement of this laterally directed flow on added bodies with axes aligned with the flight directions, such as shown in Figure 1, causes significant adverse disturbances of the air flow in the vicinities of the bodies which result in local increases of boundary-layer separation. These local disturbances and the associated boundary-layer separation are markedly reduced by shaping the axes of the bodies so that they are roughly aligned with the air flow, as shown at 13 in Figure 4.

The favorable effects described would be accomplished by bodies which have considerable cross-sectional area below the wing. However, additions to the bodies below the wing would add little to the effectiveness as described but would add considerably to the skin-friction drag and weight of the bodies.

Figure 5:
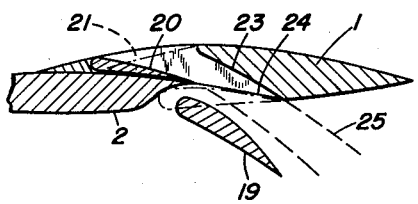
Fig. 5 is a sectional side view of a further improvement of the invention for use with a wing trailing-edge flap.

The added bodies may be modified, as shown in Figure 5, to provide an improvement in the effectiveness of a wing trailing-edge flap, such as shown at 19, in producing the highest possible lift increment. The modification consists primarily of a flap 20 which moves inside the body 1 between the full line position shown and the dotted line position 21, a ramp 23 inside the body and an opening 24 in the portion of the bottom of the body normally adjacent to the upper surface of the wing flap 19. The inner flap 20 is normally in the dotted line position 21. When the wing flap 19 is deflected downward to the full line position, to provide an increase in lift, the inner flap is also moved from its upper position 21 to the lower full line position. The surfaces of the inner flap and the ramp 23 then divert a stream of air 25 through the opening 24 over the upper surface of the wing flap 19. This stream of air, by reducing the adverse pressure gradients on the wing flap, results in a reduction of the tendency for boundary-layer separation on this flap. Since the maximum lift increment produced by the flap is normally limited by such boundary-layer separation, the stream of air 25 provides an increase in this maximum lift increment.

Figure 6:
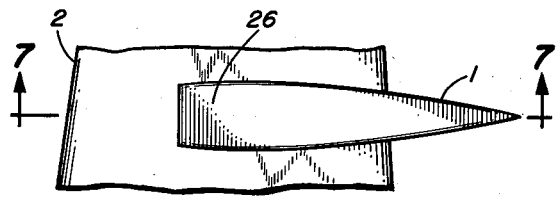
Fig. 6 is a partial plan view of a wing with an additional improvement of the invention.
Figure 10:
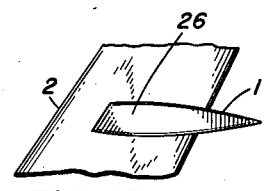
Fig. 10 is a partial plan view of a swept back wing with an alternative embodiment of the additional improvement shown in Fig. 6.
Figure 7:
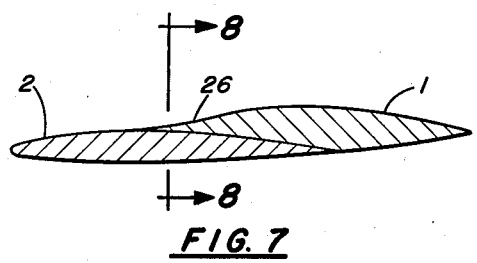
Fig. 7 is a cross-sectional view taken along line 7—7 of Fig. 6.
Figure 8:
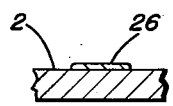
Fig. 8 is a cross-sectional view taken along 8—8 of Fig. 7.

The effectiveness of the added bodies in reducing boundary-layer separation is improved by the special shaping of the forward portions 26 of the bodies shown in Figures 6, 7 and 8. The cross sections of the bodies are spread spanwise in these regions so that the forward portions of the bodies form wedges with gradually increasing thickness as shown in Figure 7. The contours of the bodies fair smoothly from this wedge to a cross-sectional shape roughly the same as that shown in Figure 1 near the wing trailing edge. When used with a sweptback wing, the leading edge of the wedge is obliquely inclined at approximately the angle of the wing sweep, as shown in Fig. 10. The deceleration disturbances produced by the noses of adjacent bodies intersect between the bodies as shown at 32 in Figure 1. These disturbances augment one another in these regions causing relatively large increases of pressure. With the noses of the bodies pointed as shown in Figure 1, the streamwise rates of increase of pressure in these local regions is sufficiently great to cause boundary-layer separation for many speed and lift conditions. The rates of increase of pressure and the associated separation in these regions are significantly reduced when the noses of the bodies are wedge shaped as shown in Figures 6, 7, and 8.

Figure 9:
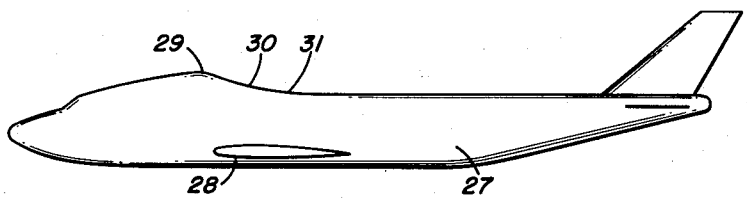
Fig. 9 is a side view of a special fuselage preferably used with the present invention.

The value of the bodies added on the wing is significantly improved when these bodies are used in combination with a fuselage shaped as described in my said Patent No. 2,874,922. Such fuselage shapes result in airplanes in which the cross-sectional area in planes generally perpendicular to the longitudinal axis has only a substantially decreasing rate of change from near the nose until the rate of change is zero and has only a substantially negative increasing rate of change rearward of the zero rate of change point. A side view of an airplane incorporating a fuselage with the special version of such a shape, described in my co-pending application Serial No. 683,431, filed September 11, 1957, now U.S. Patent No. 2,898,059, issued August 4, 1959, entitled, "Fuselage Shaping to Reduce the Strength of the Initial Shock Wave on Lifting Airplane Wings," is shown in Figure 9. The top of the fuselage 27 is contoured longitudinally with a concave curvature 29 in the vicinity of the leading edge of the wing-fuselage juncture 28, a downward slope 30 in the region of the forward portion of the juncture, a concave curvature 31 in the vicinity of the middle region of the juncture, and a longitudinally extending region of substantially constant cross-sectional area downstream of curvature 31. One of the important practical results of adding the bodies to the wing is that the Mach number at which a significant increase in drag occurs is delayed. It has been found experimentally that the delay associated with the bodies is increased significantly when the bodies are utilized in combination with a fuselage shaped as shown in Figure 9. Further, it has been determined experimentally that the adverse drag increment at lower speeds caused by the bodies is substantially reduced when the fuselage is shaped as shown.

Obviously many modifications and variations of the present invention are possible in the light of the above teachings. It is therefore to be understood that within the scope of the appended claims the invention may be practiced otherwise than as specifically described.

In the claims:

1. In an airplane, a fuselage, a wing panel extending from said fuselage, and an elongate body on the upper surface of said wing panel and extending generally chordwise thereof, said elongate body having a forward region of a progressively increasing cross-sectional area approximately the same as that of a cone and extending just forward of the wing panel region of maximum thickness, said elongate body further having a region of maximum cross section near the wing panel trailing edge, and a rear tapered portion extending aft of the wing panel trailing edge.

2. The apparatus of claim 1, said body being circular in cross section.

3. The apparatus of claim 1, said body having a straight axis extending in the flight direction.

4. The apparatus of claim 1, said body having an axis in approximate alignment with the airflow.

5. In an airplane, a fuselage, a wing panel extending from said fuselage, and an elongate body on the upper surface of said wing panel and extending generally chordwise thereof, said elongate body having a nose generally wedge-shaped in longitudinal cross section tapering to a minimum thickness just forward of the wing panel region of maximum thickness and being smoothly faired to a region of substantially circular cross-section, the maximum region of said substantially circular cross section being near the wing panel trailing edge, and a rear tapered portion extending aft of the wing panel trailing edge.

6. In an airplane, a fuselage, a wing panel extending from said fuselage, said wing panel having a trailing edge flap, an elongate body on the upper surface of said wing panel and extending rearwardly of the wing trailing edge, a slot extending generally downwardly and rearwardly through said body from the upper surface to the lower surface thereof, and a member in the upper part of said body movable from a slot intake closing position to a slot intake opening position, said flap lying in closing relationship to the outlet of said slot when in the retracted position.

7. In combination with an airfoil, at least one elongate closed body on the upper surface of said airfoil aligned with the direction of air flow over said airfoil, the nose of said body being located just ahead of the region of maximum thickness of said airfoil, the forward region of said body having a progressively increasing cross-sectional area from said nose to a maximum cross-sectional region substantially at the trailing extremity of said airfoil, and the after region of said body tapering to a terminus extending aft of said trailing extremity.

8. The combination of claim 7, wherein the nose and terminus of said body comprise apexes.

9. The combination of claim 7 wherein said body extends generally chordwise of said airfoil.

10. The combination of claim 7 wherein the forward region of said body is of a substantially conical configuration.

11. The combination of claim 7 wherein the separation distance between more than one of said bodies is approximately between one half and one chord of said airfoil.

12. The combination of claim 7 wherein the nose of said body is substantially wedge shaped.

13. The combination of claim 12 wherein the leading edge of said wedge shaped body nose is obliquely inclined at approximately the angle of sweep of said airfoil.

References Cited in the file of this patent

UNITED STATES PATENTS

| | | |
|---|---|---|
| 2,406,506 | Northrop | Aug. 27, 1946 |
| 2,532,753 | Beman | Dec. 5, 1950 |
| 2,559,823 | Klase | July 10, 1951 |
| 2,800,291 | Stephens | July 23, 1957 |

FOREIGN PATENTS

| | | |
|---|---|---|
| 845,900 | Germany | Aug. 7, 1952 |